June 28, 1932.   L. K. WRIGHT   1,865,349
REFRIGERATING APPARATUS
Filed Feb. 1, 1928   6 Sheets-Sheet 1

Inventor
Leonard K. Wright.
By Semmes & Semmes
Attorneys

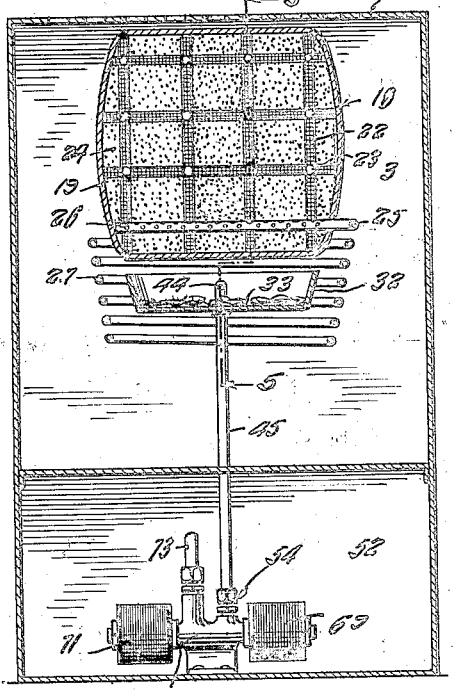
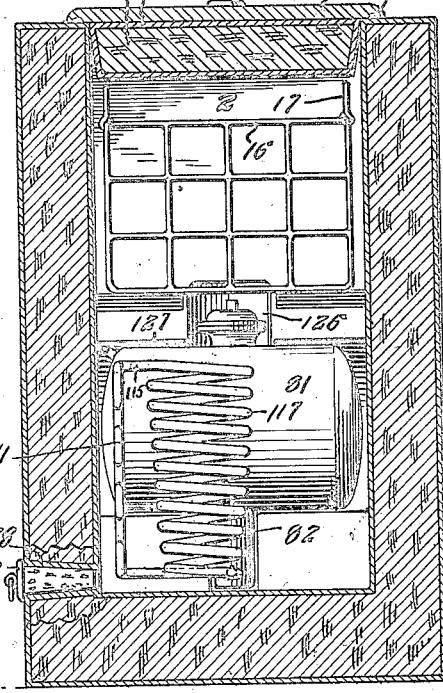
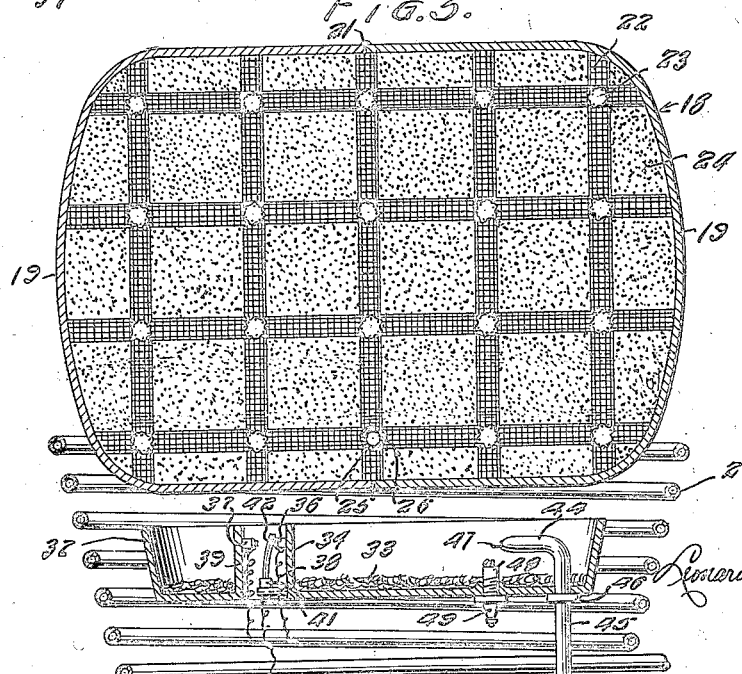

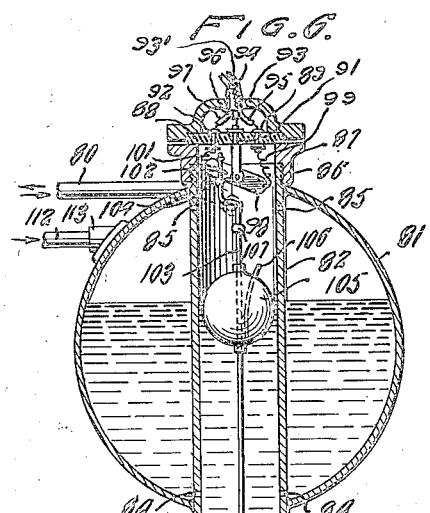
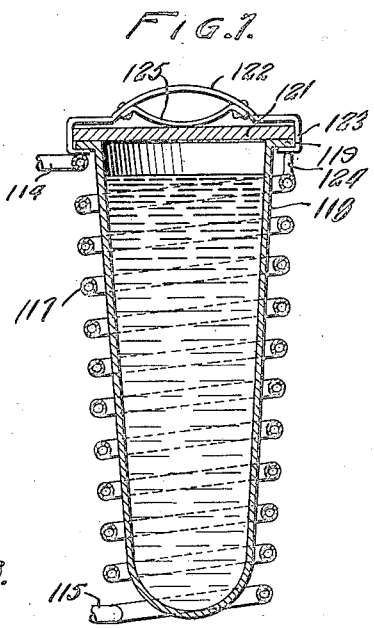
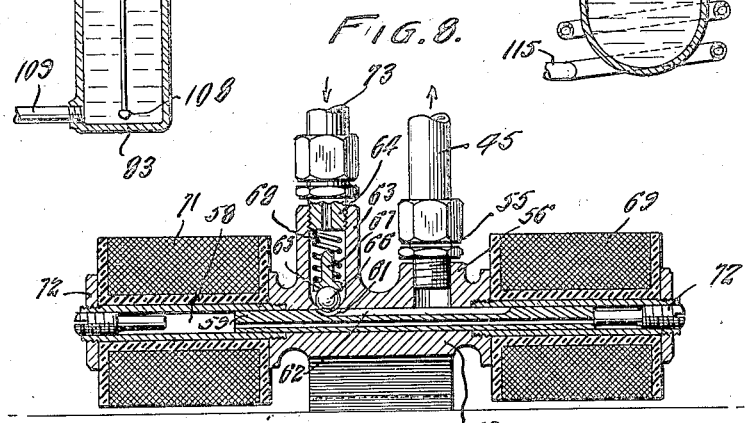
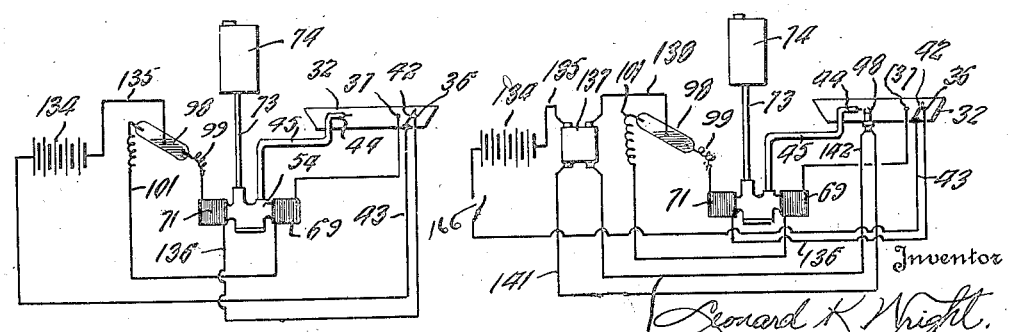

June 28, 1932. L. K. WRIGHT 1,865,349
REFRIGERATING APPARATUS
Filed Feb. 1, 1928 6 Sheets-Sheet 4
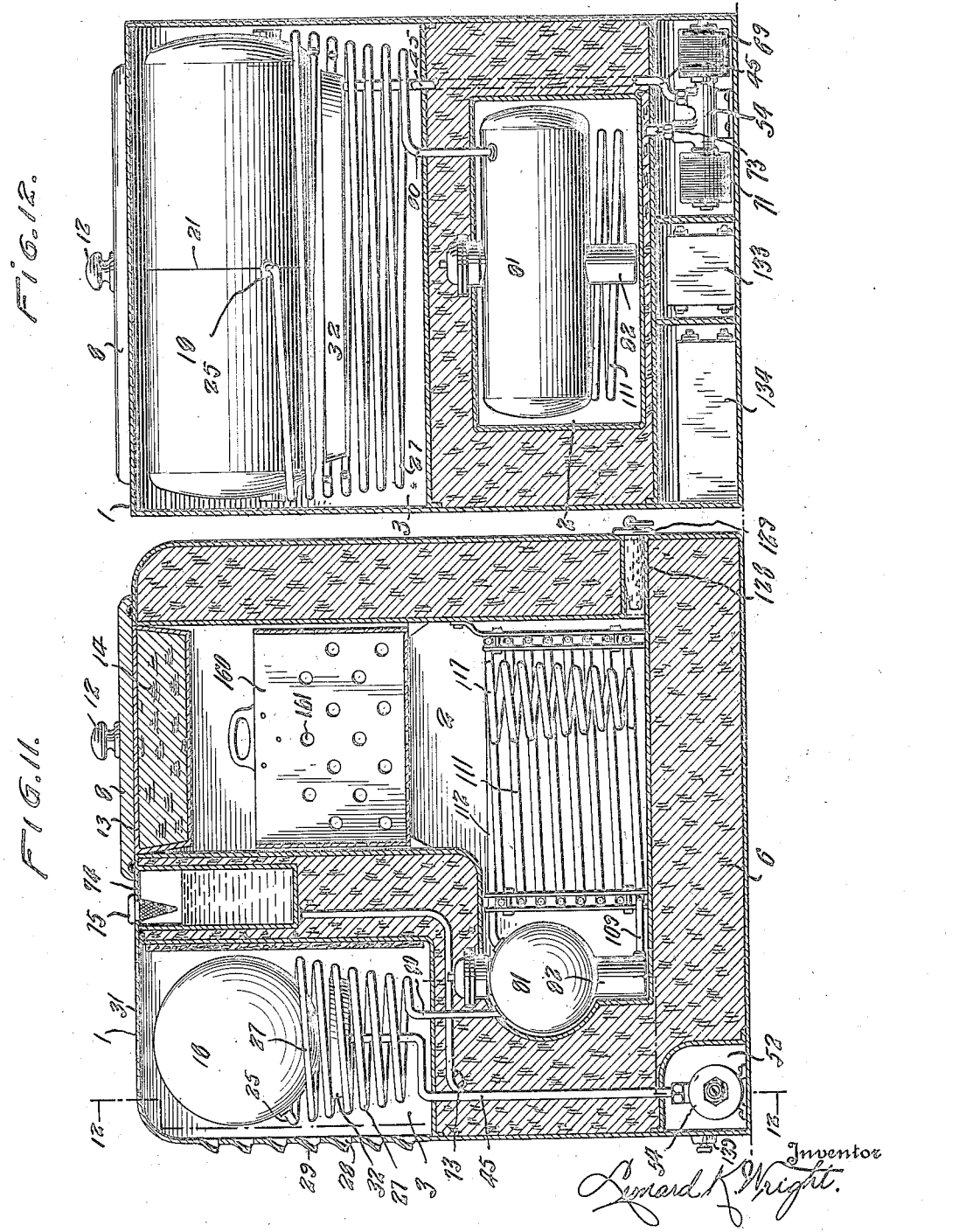
Inventor
Lenard K. Wright.
By 
Attorneys

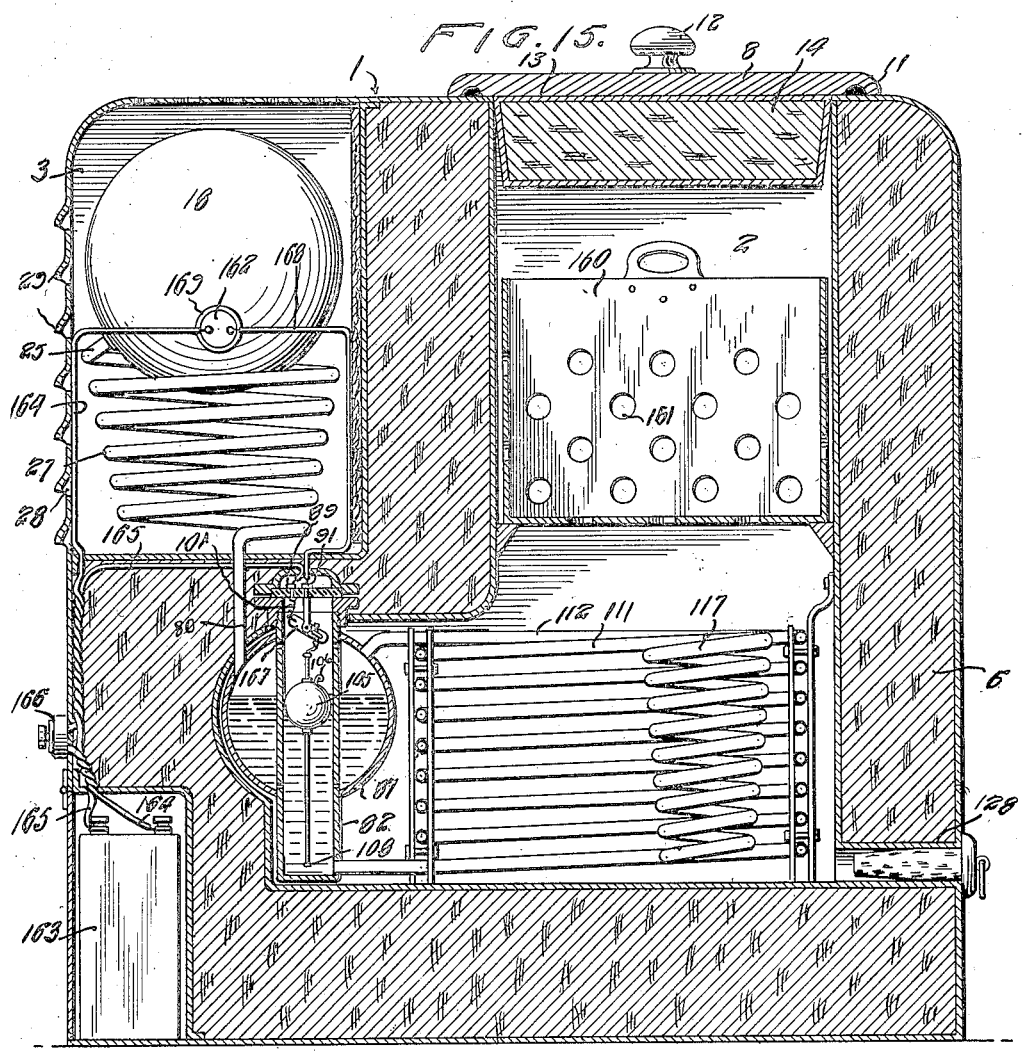
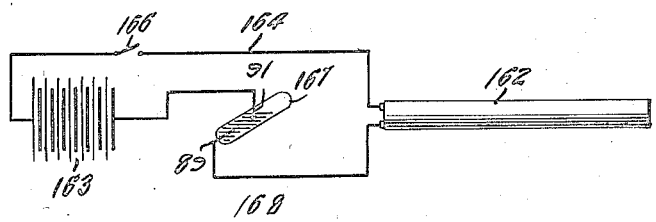

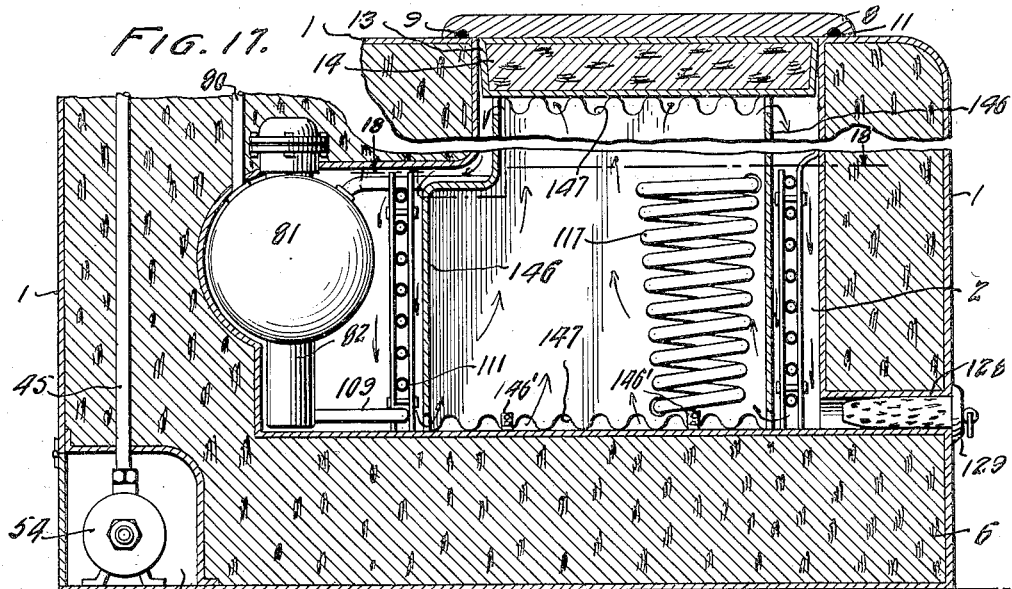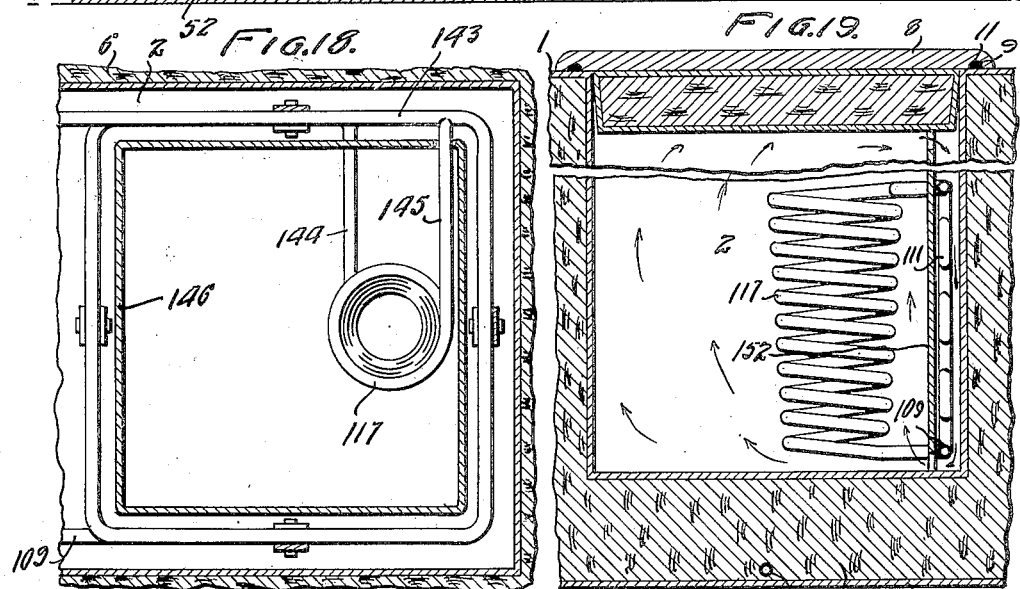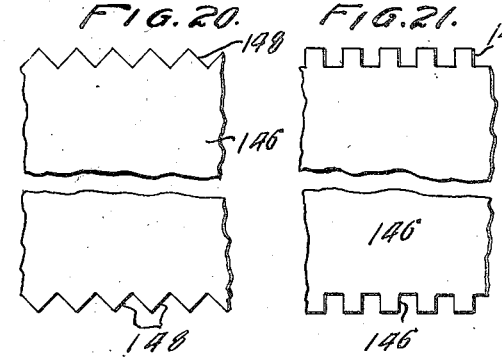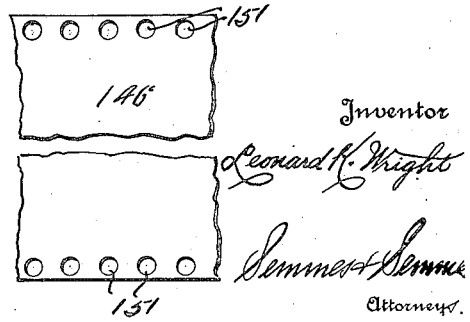

Patented June 28, 1932

1,865,349

UNITED STATES PATENT OFFICE

LEONARD KAY WRIGHT, OF JACKSON HEIGHTS, NEW YORK

REFRIGERATING APPARATUS

Application filed February 1, 1928. Serial No. 251,072.

This invention relates in general to refrigerating apparatus and more particularly has reference to a portable refrigerator.

Previous to this time, the operating mechanism of the usual refrigerating apparatus has not been adapted to withstand the shocks incident to transport as the complicated character of the apparatus has generally made delicate adjustments necessary. This difficulty is particularly apparent in refrigerating apparatus of the mechanical or adsorbent type as the maintenance of a source of power or the storage of a liquid absorbent on a moving vehicle often gives rise to almost insurmountable difficulties.

An object of this invention is to provide a compact portable refrigerator.

Another object of this invention is to provide a refrigerator, having a simple and sturdy operating mechanism.

Still another object of this invention is to provide a portable refrigerator of the absorbent type adapted to employ gasoline, kerosene or other hydrocarbon fractions or alcohol as a fuel.

A further object of this invention is to provide a refrigerator and operating mechanism that is economical to construct and automatic in operation.

A still further object of this invention is to provide a process of refrigeration.

Another object is to provide an apparatus in which the evaporator coils will automatically defrost.

And yet a further object is to provide a refrigerating apparatus adapted to maintain the air contained therein in a state of circulation.

To accomplish the above and other important objects as will more fully appear, my invention consists in general of an adsorbent-containing vessel, a condensing means, and a receptacle for the condensate and the cooling apparatus, and combinations thereof to be hereinafter set forth and claimed with the understanding that the several necessary elements comprising my invention may be varied in construction, proportions and arrangement, without departing from the spirit and scope of the appended claims.

In order that a complete comprehension of my invention may be had, reference is made to the accompanying drawings in which similar numerals indicate the corresponding members for carrying the same into practical effect, it being distinctly understood, however, that various modifications may be made in the device therein, without limiting the improvements in their useful applications to the particular construction, which for the purpose of explanation, have been made the subject of illustration.

Figure 3 is a side elevational view of the feeding mechanism showing the adsorbent tank and fuel pan in section taken on line 3—3 of Figure 1.

Figure 4 is a sectional view taken on line 4—4 of Figure 1.

Figure 5 is a sectional view of the adsorbent tank taken on line 5—5 of Figure 3.

Figure 6 is a sectional view of the receiving tank and control.

Figure 7 is a sectional view of the chilling or freezing vessel taken on line 7—7 of Figure 1.

Figure 8 is a sectional view of the feeding mechanism taken on line 8—8 of Figure 1.

Figure 9 is a diagrammatic view of the preferred circuit when alcohol is used as a fuel.

Figure 10 is a diagrammatic view of the preferred circuit when alcohol or hydrocarbon oils are used as a fuel.

Figure 11 is a sectional view showing a modification of the apparatus shown in Figure 1.

Figure 12 is a sectional view taken on line 12—12 of Figure 11.

Figure 15 is a sectional view of an apparatus having an electrical heating arrangement.

Figure 16 is a diagrammatic view of the preferred circuit when electricity is employed as the heating medium.

Figure 17 is a sectional view of an apparatus provided with two rectangular evaporating coils and a baffle.

Figure 18 is a sectional view along the line 18—18 in Figure 17.

Figure 19 is a view of an apparatus provided with an evaporating coil such as shown in Figure 1 and a baffle.

Figure 20 is a detailed view of a baffle provided with serrated top and bottom.

Figure 21 shows a modified form of baffle.

Figure 22 is a detailed view showing another modified form of baffle.

Figure 1:
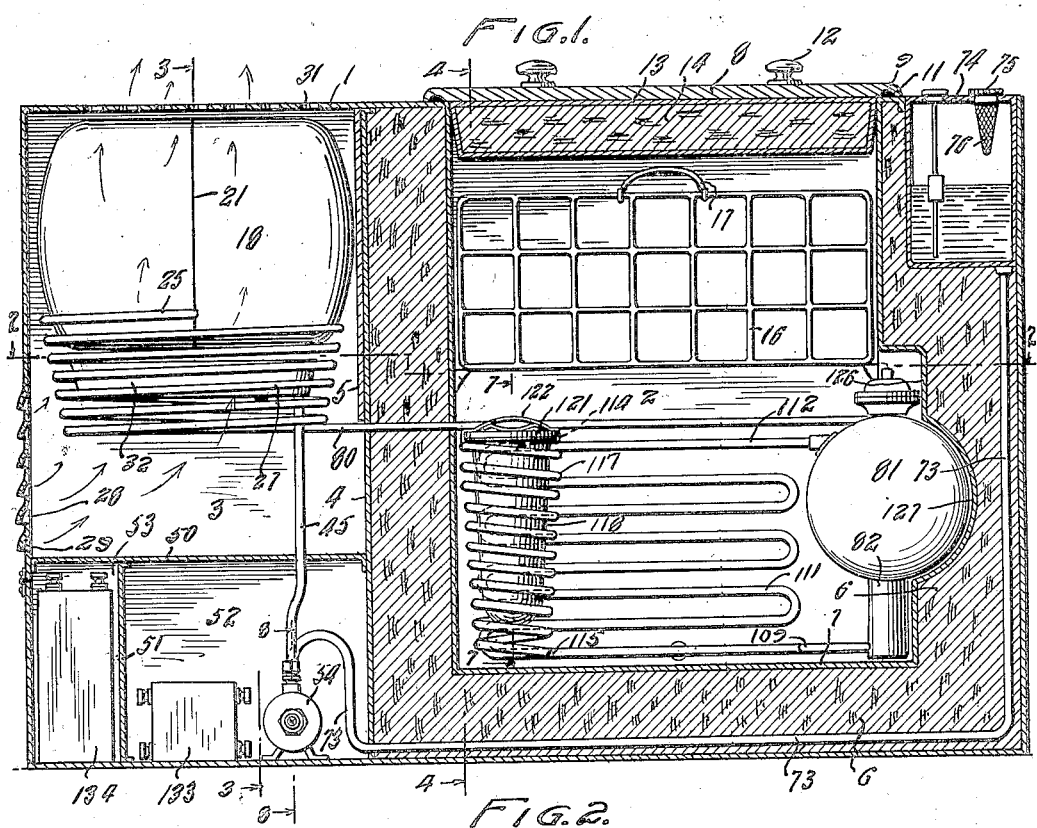
Figure 1 is a side elevational view of the operating mechanism showing the refrigerator casing in section.

Referring by numerals to the drawings and more particularly to Figure 1, there is shown a casing 1, composed of metal or other suitable material divided into a refrigerating compartment 2, and a heating compartment 3. Extending over the top of the base of the casing is a plate 4. The casing and various plates may be of any suitable material and may be welded or held together by bolts, screws or rivets. Upon the side of the plate 4 facing the heating compartment 3 is an auxiliary plate 5 provided to furnish additional insulation against exchange of heat between the heating and refrigeration compartments 2 and 3. The refrigerating compartment 2 is lined with suitable insulating material 6 to exclude heat from the compartment 3. A casing 7 is nested in the refrigerating compartment 2 to hold the insulating material, and to protect it from abrasion and moisture.

The refrigerating compartment is provided with a removable plug or door 8 formed with a groove 9 adapted to be superimposed over a suitable gasket 11, made of rubber or other resilient material, adapted to prevent the entrance of heat into the refrigerating compartment through the cover, or the gasket may be affixed to the plug 8 and bear upon the flat surface of the top proper. The plug 8 is provided with knobs 12 or other gripping means for removing or opening the cover or plug. A casing 13 containing insulating material 14 is fixed to the underside of the plug 8 and thus, the compartment 2 is fully insulated on all sides and at the top and bottom.

The casing 7 is provided with projections 15 on the four walls or on the baffle adapted to support a wire tray 16 constructed with handles 17 so that it may be easily removed from the refrigerated compartment. While any other type of tray may be employed, a wire tray is believed to allow the greatest permeation or circulation of air.

A tank 18 is positioned in the top of the heating compartment 3 on suitable supports not shown.

The tank 18 as shown in Fig. 5, is composed of pressed or drawn sections 19 welded as at 21, or it may be of pipe or tubing with heads affixed. The interior of the tank is adapted to support wire mesh 22 forming a series of channels which intersect as at 23. These channels extend above horizontally and vertically and the remainder of the tank is adapted to be filled with a suitable adsorbent 24. The mesh of the wire 22 is such as to prevent any of the adsorbent 24 entering the channels, although a refrigerant may pass from the channels into the adsorbent. In this adsorbing tank it is possible to secure a more uniform and thorough saturation of the adsorbent than heretofore as a greater surface of the adsorbent is exposed to the fluid. With the use of coarse grained adsorbent material the channel system may be reduced or eliminated.

A tube 25 is provided with apertures 26 spaced along that portion of it within the tank is fitted in one of the channels 22 or the end of the tube 25 entered into one of the distributing channels 22. Fluid is introduced to the tube from the refrigerating portion of the apparatus and is allowed to be dispersed along the length of the tank through the apertures. It will be observed that communication of the fluid is afforded from the channel in which it is received from the tube 25 to any of the channels in the tank. The tube 25 acts as an inlet for introducing the fluid to the tank and also functions as an outlet for the fluid when heat is applied to the adsorbent.

When the fluid is introduced into the tank 18 it is quickly adsorbed by the adsorbent and the saturation point is reached. The amount of fluid adsorbed depends upon the temperature and amount of adsorbent within the tank according to the recognized formula, applicable to the adsorbent material and to the refrigerant. When heat is applied to the adsorbent, the refrigerant is driven off in gaseous form which escapes through the tube 25.

The tube 25 is wound in any form giving continuous pitch below the tank and adapted to act as a condenser 27. The portion of the casing forming the wall of the compartment 3 is provided with a series of openings 28, having downwardly projecting end portions 29 adapted to direct any air that passes through the opening in an upward direction and over the condenser 27. These louvers may consist of perforated metal, without projecting portions.

When the adsorbent is heated it drives off the refrigerant in a form of a gas and pressure is built up in the tank and the rest of the system. It is well known that when a refrigerant gas is placed under pressure and subjected to cooling incident to passing through a condenser, it reverts to the liquid phase more rapidly than when condensed under normal atmospheric pressure. The types of refrigerants proposed for use in this apparatus are such that the pressures during condensation are relatively low, as regards the temperatures eliminating the need for water cooling making a considerable advance over the systems heretofore employed, which have usually required the use of water to effect condensation, and hence made the transport of such apparatus impractical.

After the air passes over the condenser, it is allowed to pass around the tank 18 and out of the compartment through a series of apertures 31 in the top of the compartment 3.

Figure 2:
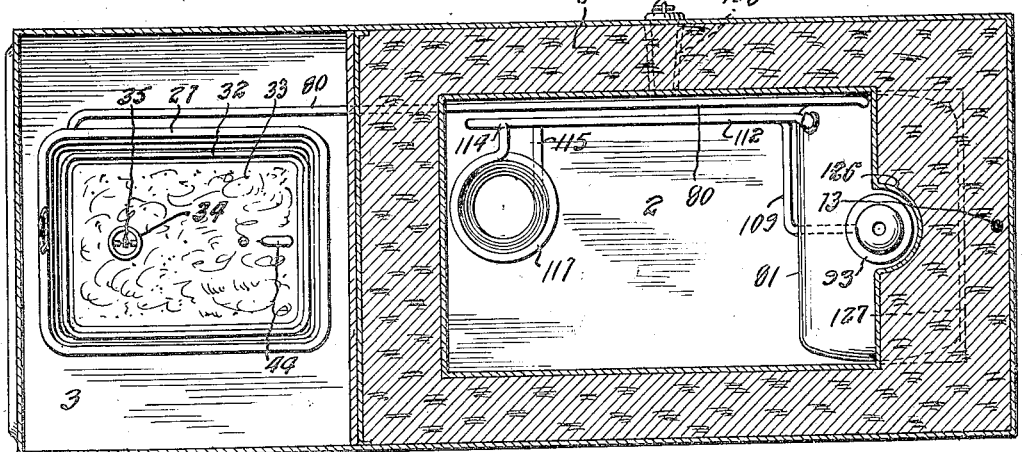
Figure 2 is a top view taken on line 2—2 of Figure 1.

A heating pan 32 is positioned within the condenser below the tank 18 on suitable supports not shown. The pan is lined on the bottom with an asbestos or porous tile mat 33, and within the pan there is seated a well 34 adapted to house a thermostat device 35 as shown in Figure 2. A plurality of oppositely disposed contact or binding posts 36 and 37 are mounted on the walls of the well to which are connected a plurality of wires 38 and 39. A bimetallic finger 42 made of metals having a different coefficient of expansion of the conventional type used in thermostats is suitably held in contact with a post 41.

When this finger 42 is heated the expansion of one of the metals is greater than that of the other, and it is caused to bend until it contacts with one of the posts 36 or 37, and with reduction in temperature that takes place, the finger bends in the opposite direction and contacts with the other post. A wire 43 is joined to the post 41 so that the finger 42 may complete the circuit with the wire 43 through either the wire 38 or 39.

A bent jet 44, having a tip of spongy platinum or other ignition material affixed to the end, is extended through the base of the pan 32 suitably secured to a pipe 45 by means of nut 46. The pipe 45 is adapted to supply the jet 44 with the fuel that is to be ignited. The platinum sponge or other material is adapted to ignite the vapors of the liquid discharged from the jet 44, or if a fuel such as gasoline or kerosene is employed it may be ignited by a spark plug 48 positioned adjacent the orifice of the jet 44. The spark plug 48 is screwed into a threaded aperture of the base 32 until a flange 49 on the spark plug rests against the bottom of the pan, and by means of a gasket not shown a fluid tight seal affected. Wires, not shown, are connected to the spark or high tension coil for actuating the spark plug, or gap.

When it is desired to heat the adsorbent, a suitable fluid is introduced through the supply pipe 45 when it passes into the jet 44 and is discharged from the orifice. The fuel is ignited by either the platinum tip or the spark plug, dependent upon the kind of fuel used, and the tank 18 heated by the flame. Should any of the fuel fail to be ignited, it will flow upon the porous mat 33 and in a short time caused to burn by the heat of the flame, or through the action of either of the ignition devices. The thermostat governs the operation of the spark plug and also the supply of fuel, as will be more specifically hereinafter pointed out.

The compartment 3 is formed with a false floor and the space below divided by a partition 51 to form two compartments 52 and 53. Connected to the line 45, a valve 54 is mounted within the compartment 52 adapted to regulate the supply of fuel to the jet 44. The pipe 45, as shown in Fig. 8, is suitably joined to a connector 55, threaded in a port 56 in the body portion of the valve 54. The valve is formed with a central channel 58, in which is mounted a slidable member 59 formed with an indentation 61 on the top. The member 59 is also cut away on both sides, from the indentation to form a rib.

Another port 63 is provided in the valve in which is enthreaded a connector 64. One end of the port 63 is tapered as at 61 adapted to form a seat for a ball 66. The ball is held by a ball rest 67 in the seat 65 by means of a spring 68 mounted on a projection formed on the ball rest. Solenoid coils 69 and 71 are mounted on each end of the body portion of the valve and when energized serve to draw the slidable member 59 to one or the other ends of the valve.

When the slidable member 59 is in the position shown in Fig. 8, it will be seen that the ball 66 is held firmly in its seat and the admission of any fuel into the port 63 prevented. If the solenoid 71 is energized, however, the slidable member 59 will be drawn within it and the fin on the slidable member supporting the cut away portion 62 will force the ball 66 out of its seat 65 so that fluid from the port 63 may then pass through the cut away portions 62 and out of the valve by way of the outlet port 56.

Stops 72 are enthreaded in each end of the channel 58 to limit the movement of the slidable member 59. By adjusting these stops it is possible to fix or regulate the limit in which the slidable member 59 may operate.

A section of pipe 73 is threaded or fitted in the connector 63, as shown in Fig. 1 and Fig. 8, and adapted to pass through the insulation 6 of the refrigerating chamber and be connected to a reservoir 74 containing the supply of fuel. The reservoir 74 is provided with a screw cap 75 through which fuel may be introduced. A removable filter or screen 76 is attached to the inlet so that when the cap 75 is removed, any dirt or foreign matter contained in the fluid introduced, that might clog the valve 54, may be eliminated.

The condenser is drained through a pipe 80 passing into the refrigerating chamber 2 and connected to a receiving tank 81 provided with a well 82 as shown in Fig. 6. The well 82 extends below the bottom of the tank 81 and is formed with a base 83. A series of apertures 84 are provided around the well near the base of the tank 81 and another series of apertures 85 are provided around the well near the top of the tank 81, the purpose of these apertures being that while the liquid level in the well is thus freely permitted to coincide with the level in vessel 81 any motion or surging of the fluid within vessel 81 due to shocks or sudden jars is not transmitted to the liquid in the well. Therefore the liquid in the well is maintained with little or no lateral motion and the float is not subjected to any surging or swaying due to the motion of the fluid.

The well 82 extends above the top of the tank 81 and is provided at the top with threads 86 adapted to engage corresponding threads of a cap 87. A bearing plate 88 composed of insulating material is seated on the cap 87. Extending through the bearing plate are a series of posts 89, 91 and 92 adapted to convey electric current. Upon the bearing plate 88 there is imposed a crown 93 which is bolted or fastened to the cap 87 by appropriate means not shown, and a leak-proof joint effected by a gasket not shown. A cable 94 containing three wires, 95, 96 and 97 extends through an aperture 93' in the crown 93 and the wire 95 secured to the post 89, the wire 96 fastened to the post 91 and the wire 97 joined to the post 92. The electric conducting plugs extend through the bearing plate 88, and, by means of a gasket or washer and pressure exerted by a nut enthreaded upon the plug a fluid tight jointure is secured. The hollow space existing in the crown 93 is filled with wax, pitch, tar, or a suitable waterproofing and insulating compound. This holds the cable 94 firmly in place, prevents moisture from entering and so obviates short circuiting and also provides an additional backing to aid in resisting pressure on the insulating plate 88.

One post 91 is provided with a fork, one leg only being shown in Fig. 6 between which there is pivotally supported a mercury tube 98. The pivoting means may include rods made of material capable of conducting an electric current from the fork 91 extending within the mercury tube and bent to project into either end of the tube. A wire 97 is joined to the post 92 and a wire 101 or connection therefrom is fused to one end of the mercury bulb 98. When the bulb is tilted as shown in Fig. 6, a current may pass from the wire 95 through the post 89, and thence through the wire 99 to one end of the bulb 98. The mercury in this end of bulb 98 will then conduct the current from the wire 99 to the supporting forks of post 91 to the wire 96, thus completing a circuit.

A wire 101 is fastened to the post 92 and a wire or connection therefrom is fused into one end of the mercury tube 98 so that a current may pass from the wire 97 to the wire 96 when the bulb is tilted to a position opposite to that shown in Fig. 6.

The mercury bulb 98 is provided with a ring or eye 102, preferably fastened directly to the bulb or its supporting device or hanger. Projecting through the ring 102 is a rod 103 provided with beads 104. Slidable along the rod 103 is a float 105 provided with a tube 106. The tube 106 maintains a pressure within the bulb 105 equal to the external pressure, thus preventing any possibility of the bulb being crushed by differences in pressure, as in a refrigerating apparatus of this type there are usually considerable fluctuations in the pressure existing within the system. Also this construction permits the utilization of thinnest and lightest material.

During the operation of a refrigerating process, vapors or droplets of the refrigerant might enter the float. This is retarded, or prevented, however, by reason of the bent end portion of the tube 106, shown in Fig. 6 and Fig. 15, so that the entrance of a refrigerant into the float must necessarily follow a circuitous and also an antigravitational path. If the refrigerant enters the float in the form of vapor, it will be condensed within the float during the period of high pressures, and will fall to the lowest portion of the float. It will be observed that the tube 106 extends within close proximity to this low or bottom portion of the float, and its low end will be emersed by any of the condensed refrigerant.

During the heating cycle, the pressure within the float will increase with the rise in pressure throughout the system. When there is a fall in the pressure in the system, however, the pressure within the bulb will tend to assume the pressure existing in the system and in so doing will expel such liquid existing in the bulb 105 and also relieve itself of any gas pressure. This differential in pressure will therefore force the condensed refrigerant in the bulb out through the tube 106. It will be seen that this arrangement tends to maintain the inside of the float free from any refrigerant, which may enter either through leakage of the float or through the tube 106.

As it has been stated, the liquid level within the casing 82 is equal to the level existing in the tank 81. The position of the bulb 105 therefore indicates the liquid level within the tank 81. The rod 103 is formed with a bead 107 near the top and another bead 108 at the bottom, so that vertical movement of the bulb 105 on the rod 103 is restricted until the bulb contacts with either one of the beads. When the liquid level rises and the float or bulb pushes against the bead 107, the mercury bulb 98 is drawn to the position shown in Fig. 6. When the liquid level is lowered and the float 105 contacts with the bead 108, the mercury bulb is tilted to the opposite position.

Referring to Fig. 6, a pipe 109 integral with a pipe 111 having a series of convolutions forming an evaporating coil is threaded, welded or secured in the base of the well 82. The pipe 111 is integral with pipe 112 which is threaded or suitably joined to the tank 81 at 113 near the top. Referring more particularly to Fig. 1 and Fig. 2, it may be seen that the pipe 114 is teed to pipe 112 and pipe 115 teed into 109, and between 114 and 115 there is interposed a helical coil of pipe 117.

The coil 117, as shown in Fig. 7 is adapted to support a removable flask 118 having an outturned lip 119 to rest upon the coil. A cover 121 conforming to the sectional shape of the flask is resiliently secured to the flask. The means for thus securing the flask 118 and the cover or top 121 comprises a member 122 provided with an outturned portion 123 and inwardly projecting lips 124, having a spring 125 mounted on the underside adapted to press firmly against the top 121. The flask 118 may be filled with water or with other suitable liquid or liquids, or even solids, that it is desired to maintain at a very low temperature or to freeze the same. The coils 117 and the convolution of the pipe 111 serve as vaporizers for liquid refrigerants and therefore the maximum refrigerating action is in the vicinity of these members.

If an even temperature is desired in the compartment 2, a baffle may be used to give the required air circulation. In the absence of such a baffle, or other appropriate means, there is a tendency for stratification of air within the chamber. The cold air remains at the bottom and the other air grows warmer toward the top. If an even temperature is necessary, the preferred method of insuring the same is shown in Figs. 17 and 18.

In this apparatus, evaporating coils 143 are rectangularly disposed, approximating the size of the chamber. Liquid refrigerant is introduced to the coils by the pipe 109, similar to the pipe shown in Fig. 1. The liquid refrigerant flows through the coil 143 until the same height is obtained in the coils as exists in the well 82. Teed to the coil 143 near its lower portion is a pipe 144 which conducts liquid refrigerant to the coil 117. Another pipe 145 conducts the gaseous refrigerant from the coil 117 to the upper portion of the coil 143.

Within the rectangularly disposed coil 143 there is positioned a baffle plate 146, which takes in general the shape of the coils 143. This baffle plate extends from the base of the compartment 2 to the top thereof, and is suitably maintained in this position by angle irons 146' or other appropriate means. The top and bottom of the baffle plate 146 may be scalloped as shown in Fig. 17. Under most conditions of operation this is the preferable form. Other alternative forms, however, may be substituted under suitable conditions. For instance, in Fig. 20 I have shown sections of a baffle in which the top and bottom are serrated as at 148. Again, in Fig. 20, I have shown a castellated form 149. It is also within the purview of my invention to have the baffle 146 extend the full height of the compartment and have at the top and bottom apertures 151. In any of these forms the base of the baffle rests upon the bottom of the compartment and when the plug 8 is inserted, the top of the baffle fits closely against the bottom of the plug. In this way additional support is given the baffle and any shocks or jars incident to transportation do not subject the baffle to undue strain. The pipes 144 and 145 pass through the baffle, it being observed that the coil 117 is positioned within the baffle 146.

By these means the air within the compartment 2 is kept in a state of constant circulation. As is well known, warm air, having less density than cold air, rises within any container. As the air within the compartment increases in temperature, it will rise toward the top. This air at the top must necessarily be displaced by warmer air continuing to rise, and in so doing passes through the openings provided at the top of the baffle into the space between the baffle and the walls of the chamber. On contacting with the evaporating coils 143, it is chilled and sinks to the bottom of the chamber. This air is also being forced downwardly by added increments of cool air, and is forced through the openings at the base of the baffle into the area bounded by the baffle. A heat exchange occurs between the contents of the compartment and the chilled air, the latter taking up the heat of the contents. In so doing, it rises to the top of the compartment, and the cycle is repeated.

While the forms shown in Figs. 17 and 18 are preferable when it is desired to position a baffle in the chamber, under certain circumstances the apparatus shown in Figs. 1 to 15 may be provided with a baffle. In these figures it will be observed that the evaporating coils 111 are positioned in the same vertical plane. In this case a baffle 152 is placed next to the coil 111 on the opposite side of the coil from the adjacent wall of the compartment. This baffle is provided with any one of the alternative forms of top and bottom and the circulation of air maintained in the same way as obtains in the case of the apparatus shown in Figs. 17 and 18.

Referring to Fig. 2, it will be observed that the tank 81, coils 117 and convolutions of the pipe 111 are so positioned in the refrigerating compartment 2 that there is afforded a maximum of storage space for articles or commodities to be kept at a low temperature. The casing 7, as shown in Fig. 1, is set off as at 126 and there is an indentation 127 into which extends the tank 81. The tank 81, with the well 82, may be buried in insulation, with the pipes 80, 109, 112 entering the chamber through the inner lining 7.

An aperture 128 is provided in the casing 7 and insulation 6 of the refrigerating compartment 2. This aperture is formed at, in or near the bottom of the refrigerating compartment so that any water collecting in the base of the compartment may be readily drawn off. A plug 129 is provided to stop the aperture except when it is desired to drain off the water. The plug 129 is composed of suitable insulating material to insure a minimum heat transfer between the atmosphere and the refrigerating compartment.

Figure 13:
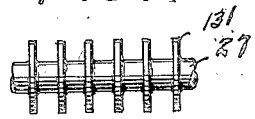
Figure 13 is a side view of a section of the condenser having radial disks.
Figure 14:
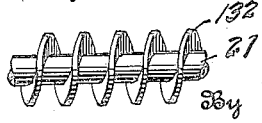
Figure 14 is a side view of a section of the condenser having spiral radiating disks.

Although I have shown a condenser composed of conventional pipe, it may be desirable, under certain circumstances, to provide such pipe with discs. In Fig. 13, I have shown such discs 131 suitably soldered or joined to the condenser 27. It is apparent, of course, that the discs 131 add considerably to the radiating surface of the condenser and therefore aid the distribution of heat and afford a more effective condensation. In Fig. 14, I have shown still another form of condenser in which spirals 132 are soldered to the condenser. Such spirals or any other sort of fins or finning afford additional radiating surfaces and can be used on the condenser.

In the compartment 52 there is also suitably secured a spark coil 133, and in the compartment 53 there is provided a battery 134. The various electrical elements of the apparatus are joined as shown in Figs. 9 and 10. In Fig. 9 there is shown the electrical diagram adapted for alcohol as a fuel. The battery 134 shown diagrammatically furnishes the electric energy for the operation of the valve 54, which in turn governs the flow to the jet 44. Current flows from the battery 134 through the wire 135 to the mercury bulb 98. When the bulb is in the position shown in Fig. 6, the current flows from post 96 to the mercury bulb 98 to the wire 99 and into one of the solenoids (71) of the valve 54. This causes the slidable member 59 to be drawn within the solenoid and the valve opened. The current flows through the wire 136 to the cold side of the thermostat 36 whereupon the finger 42 conducts the current from the cold side to the wire 43 and back to the battery 134.

When the fuel is ignited through the action of the ignition tip the temperature within the pan increases and the finger 42 bends to the opposite side 37 of the thermostat so that a current flows from the battery 134 through the wire 135 to the mercury bulb 98. When the mercury bulb is tilted to the opposite direction, the current is allowed to pass through wire 101 to the "closed" solenoid 69 and thence to the "hot" contact 37 through the finger 42 and wire 43 back to the battery.

When the flow of combustible material is cut off by the valve and the flame extinguished the temperature within the pan is lowered and the finger 42 bends away from the "hot" contact 37, the circuit is broken and electric current conserved. The finger 42 continues to bend on further cooling until it makes contact with the "cold" contact 36. It will be observed from the foregoing that the various electrical elements, such as the thermostat 35, are so arranged that shortly after the current has performed its useful function, the circuit is opened and a further drainage on the battery prevented.

In Fig. 10 there is shown the electrical set up preferred for use with kerosene or gasoline as a fuel and adapted for use with alcohol as well. Current flows from the battery 134 or other source of electrical energy through the wire 135 to the induction or spark coil 137, through a wire 138 to the center of the mercury bulb 98. From the mercury bulb, in the position shown in Fig. 10, the current passes through the bulb to the wire 99 and to the open solenoid 71 where it thence flows through the wire 136 to the "cold" side 36 of the thermostat. The finger 42 conducts the current from the cold point 36 to the wire 43 and back to the battery 134. When a switch 139, shown diagrammatically in Fig. 10 and positioned as shown in Fig. 11, is closed the current is permitted to flow through a circuit and the induction coil 137 causes a high tension current to pass through wires 141 and 142 to the spark plug 48 causing the plug to spark.

The same method of opening the circuit applies in this arrangement as in that arrangement shown in Fig. 9. Shortly after the fuel has been ignited the temperature in the pan causes the finger 42 to bend to the "hot" point 37, thus opening the circuit previously established to open the valve 54. With the finger 42 in contact with the point 37, a circuit to close the valve 54 is established as soon as the bulb 98 flips to the opposite position. It is manifest that a brine tank or other conventional hold over device may be used to keep the temperature at a reduced point while the heating cycle is in action, although tests prove that a negligible rise of 2 to 4 degrees Fahrenheit is the extent of temperature rise.

By the use of direct expansion coil or coils, without the medium of a brine or hold over tank, the coils will free themselves of any coating of frost or ice which has fastened itself upon the coil or evaporating section during the cooling or evaporating period.

Thus a great improvement is made over other systems which have to be stopped frequently to permit the coils to shed the coatings of frost and ice.

The operation of my invention may be readily understood from the foregoing. When the refrigerant is adsorbed, the receiving tank 81 is empty and the bulb 105 rests against the bead 108 so that the bulb 98 is forced to the position shown in Fig. 9, and the valve 54 is opened. The open valve permits the passage of fuel from the tank 74 through the pipe 73 and through the valve and pipe 45 to the jet 44, where it is ignited upon discharge and the temperature of the adsorbent within vessel 18 raised by the heat causing the refrigerant to be driven off in the form of a gas, through the tube 25 to the condenser 27. When heat is applied to the adsorber-generator 18, the pressure within the system is increased, and this factor together with the cool air contacting with the condenser 27 condenses the refrigerant. The condensate passes through the pipe 80 into the tank 81 and flows into the well 82 and the convolutions of the pipe 111. When the level of the refrigerant within the tank 81 forces the float 105 against the bead 107, the bulb 98 is caused to switch to the position shown in Fig. 6, thus closing the valve 54 and thereby cutting off the supply of fuel to the jet 44, and extinguishing the flame.

When the flame is extinguished and the vessel 18 cooled by the action of air there is a concomitant reduction in pressure and increase in the adsorptive capacity of the adsorbent. With a reduction in pressure, there is a vaporization of the liquid refrigerant. While some of the liquid refrigerant within the tank 81 will evaporate and such a vessel be used as a cooling medium the major part of the vaporization occurs within the convolutions of the pipe 111 and coils 117 and the vaporized refrigerant will pass into the top of the tank 81 and thence through pipe 80 and condenser 27 to the adsorbent tank 18 where it is readsorbed.

Various modifications may be made in the arrangement of the elements of the device, such as is shown in Figs. 11 and 12, the principles of operation of the two devices being identical, and the only difference being changes of arrangement. It may be observed that the receiving tank 81 is located on the same side of the box as the adsorbent tank 18 and the evaporating coils are slightly changed in position, while the supply tank 74 is positioned in the partition between the heating and evaporating chambers and may or may not be located in the cooling compartment 2. The tray 160 employed is not of the wire type, but is of sheet metal with apertures 161 positioned therein to permit the passage of air through the contents.

Various other modifications may be made in the structure along the lines shown in Figs. 11 and 12, which changes, I wish to be distinctly understood, do not depart from the spirit and scope of my invention.

In Fig. 15 there is shown a section of a portable unit in which heat is applied by means of a resistance heater coil or coils 162 or any other suitable resistance heater such as a carbon rod, positioned longitudinally in the adsorber-generator 18. The device shown in Fig. 15 is similar to the one set forth in Figs. 11 and 12, except that electricity is used as the heating medium. A battery 163 is positioned in the bottom of the box connected to two wires 164 and 165 and a switch 166 is fixed in or on the side of the box to control the operation of the device. The wire 164 is connected to one terminal of the resistance heater 162 and the other wire 165 is connected to the post 89. The post 92 may be discarded in this type of apparatus, for the mercury tube in this construction is of the one point contact type. A wire 168 is affixed to the post 91 which leads to the other connecting pole of the resistance heater. The resistance heater 162 is positioned in a housing 169, such housing being of any metal, having properties of high heat conductivity, in order that heat from the resistance heater may be readily transferred to the adsorbent within the generator 18.

When the level of the liquid within the receiving tank 81 falls, the bulb 105 strikes the bead 108 thus tilting the bulb so that the mercury covers the tips of the wire from the post 89, and the tips of the pivotal support within the mercury bulb 167. In this manner electricity is caused to flow from the battery 163 or other source of power through the wire 165 to the post 89, and thence through the wire 101 to the tube 167 which contains the mercury and flows through the mercury. The current then travels through the post 91, and the wire 168 to the resistance heater 162, and thence through the heater and back to the source of current through the wire 164. The heating of the resistance heater drives off the adsorbed refrigerant contained in the vessel 18, causing it to pass into the condenser 27 and thence to the receiving tank 81. When the receiving tank 81 is filled to the proper depth with the condensed refrigerant, the mercury tube 167 is caused to tip and thus open the circuit which remains open and does not close until a sufficient fall of the level of refrigerant in the receiving tank has taken place.

There is accomplished by this invention a compact portable refrigerator of the adsorbent type having a simple and sturdy automatic operating mechanism economic to construct and subject to little or no wear or deterioration and adapted to employ gasoline, kerosene or other hydrocarbon oils, or alcohol or electricity as a fuel or heating means and cool the articles or commodities that may be placed within the cooling or storage chamber by process of refrigeration.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:—

1. A refrigerator comprising a casing having a cooling compartment, a heating compartment, means in the cooling compartment to cool material, adsorbent means in the heating compartment to operate the cooling means, a fuel to heat the adsorbent, means adjacent the cooling compartment on the side most remote from the heating compartment to store the fuel and means to conduct the fuel to the heating compartment.

2. A refrigerator comprising a casing having a cooling compartment, a heating compartment, means in the cooling compartment to cool material, adsorbent means in the heating compartment to operate the cooling means, a burner adapted to hold a fuel to heat the adsorbent and means adjacent the cooling compartment on the side most remote from the heating compartment and communicating with the burner in the heating compartment adapted to contain fuel.

3. A refrigerator comprising a cooling compartment, a heating compartment, means in the cooling compartment to cool material, adsorbent means in the heating compartment to operate the cooling means, a burner positioned below the adsorbent containing means adapted to contain a fuel to heat the adsorbent means adjacent the cooling compartment on the side most remote from the heating compartment and communicating with the burner adapted to contain fuel, means to introduce fuel into the burner, means to regulate the introduction of fuel into the burner and means to automatically ignite the fuel upon its introduction into the burner.

4. A portable refrigerator comprising a cooling compartment, a heating compartment, means in the cooling compartment to cool material, adsorbent means in the heating compartment to operate the cooling means, a pan adapted to contain fuel, positioned below the adsorbent containing means, and a platinum sponge fixed in the pan to ignite the fuel.

5. A portable refrigerator comprising a cooling compartment, a heating compartment, means in the cooling compartment to cool material, adsorbent means in the heating compartment to operate the cooling means, a pan adapted to contain fuel, positioned below the adsorbent containing means, a platinum sponge and a spark plug fixed in the pan to ignite the fuel.

6. A refrigerator comprising a cooling compartment, a heating compartment, means in the cooling compartment to cool material, a tank positioned in the heating compartment, a series of wire screen tubes mounted transversely within the tank, an adsorbent between the tubes, means forming a condensing coil communicating with a receiving tank positioned in the cooling compartment to introduce a refrigerant in the tubes and means to heat the adsorbent.

7. A refrigerator comprising a cooling compartment, a heating compartment, a tank adapted to contain a refrigerant positioned in the cooling compartment, a formation tank positioned opposite the refrigerant tank, a coil about the formation tank communicating with the refrigerant tank and means to vary the pressure in the coil to cool fluids in the formation tank.

8. A refrigerator comprising a cooling compartment, a heating compartment, means in the cooling compartment to cool material, adsorbent means in the heating compartment to operate the cooling means, a burner positioned below the adsorbent containing means adapted to contain fuel to heat the adsorbent means adjacent the cooling compartment on the side most remote from the heating compartment and communicating with the burner adapted to contain fuel, means to introduce fuel into the burner, and electrical means controlled by said means in the cooling compartment to regulate the introduction of fuel into the burner.

In testimony whereof I affix my signature.

LEONARD KAY WRIGHT.